US012422822B2

United States Patent
V et al.

(10) Patent No.: US 12,422,822 B2
(45) Date of Patent: Sep. 23, 2025

(54) RESUME OF FAILED AUTOMATES IN END-TO-END PROCESS

(71) Applicant: SAP SE, Walldorf (DE)

(72) Inventors: Naveen V, Karnataka (IN); Shanavas Madeen S, Krishnagir (IN); Ravikanth Malipeddu, Karnataka (IN)

(73) Assignee: SAP SE, Walldorf (DE)

( * ) Notice: Subject to any disclaimer, the term of this patent is extended or adjusted under 35 U.S.C. 154(b) by 354 days.

(21) Appl. No.: 17/871,246

(22) Filed: Jul. 22, 2022

(65) Prior Publication Data

US 2024/0027998 A1    Jan. 25, 2024

(51) Int. Cl.
     *G05B 19/4155*     (2006.01)

(52) U.S. Cl.
     CPC ........... *G05B 19/4155* (2013.01); *G05B 2219/31368* (2013.01)

(58) Field of Classification Search
     CPC ........................................... G05B 2219/31368
     See application file for complete search history.

(56) References Cited

U.S. PATENT DOCUMENTS

| 11,415,971 | B2 * | 8/2022 | Bhagavat | G05B 13/027 |
| 2006/0106473 | A1 * | 5/2006 | Enright | G06Q 10/0631 |
| | | | | 700/103 |
| 2006/0267577 | A1 * | 11/2006 | Erez | G11C 29/56008 |
| | | | | 324/759.03 |
| 2020/0083080 | A1 * | 3/2020 | Clark | H01L 21/76879 |

\* cited by examiner

*Primary Examiner* — Nathan L Laughlin
(74) *Attorney, Agent, or Firm* — Buckley, Maschoff & Talwalkar LLC

(57) ABSTRACT

According to some embodiments, systems and methods are provided, including at least one end-to-end (E2E) scenario including a sequence of process steps; a plurality of automates, wherein an automate is executable for each process step; a memory storing processor-executable code; and a processing unit to execute the processor-executable program code to: execute the plurality of automates in a sequential order that matches a sequential order of the process steps; for each executed automate, determine whether the executed automate failed; in a case it is determined the executed automate failed, identify dependent transactional data input to the failed automate, wherein the dependent transactional data includes one or more data objects; identify a validity state of each data object; and resume execution of the process steps based on the identified validity state. Numerous other aspects are provided.

20 Claims, 7 Drawing Sheets

| PRIME GUID (602) | APPIN ID (604) | DATA REF (606) | QUERY/SERVICE REQUEST (608) | MODE (610) |
|---|---|---|---|---|
| PG001 | APP A | SALES ORDER | Https://hostname...SalesOrderWI_F183 ("xxx") | AUTOMATIC |
| PG002 | APP B | INVOICE | SELECT SINGLE STATUS FROM BILLING_TABLE INTO tempTABLE WHERE SALESORDER = "xxx" | MANUAL |

| STATUS GUID (632) | PRIME GUID (634) | STATUS (636) |
|---|---|---|
| SG001 | PG001 | AWAITING APPROVAL |
| SG002 | PG002 | IN-PROCESS |
| SG003 | PG003 | OPEN |

| PRIME GUID (662) | RESPONSE PROPERTY (664) |
|---|---|
| PG001 | Salesorderstatus |
| PG002 | status |
| PG003 | Billingstatus |

RESUME OF FAILED AUTOMATES IN END-TO-END PROCESS

BACKGROUND

Organizations make use of automation tools (i.e., software tools) to simplify and execute complex organizational processes (organizational needs). The automation tools may be automated such that they operate with minimal input from the user. In some instances, the organizational processes may be used in end-to-end (E2E) scenarios. An E2E scenario may include a sequence of process steps that may be supported by the automation tools. The automation tool may execute program code to perform each of the process steps. The process steps may be chained together to complete the E2E scenario, whereby data created during execution of one of the process steps may be used by a next process step. As a non-exhaustive example, after receipt of input data from a user, a first process step may place an order and may generate an order number. Then the second process step may use the generated order number to create a delivery. Organizations may test the E2E scenario to verify the data output from the execution of the automated E2E scenario is the expected data. In particular, the testing may ensure that the E2E scenario when executed by the automation tool works properly.

During testing of the E2E process, the E2E process may be executed by an automation tool using test scripts/automates that simulate, or mimic, an end user's actions to complete each process step. The test scripts/automates may use test transactional data to execute the processes. When one of the automates fails, conventional automation tools provide for the resumption of the E2E process execution from the process step that is the point of failure without validating the data received at this point of failure. However, the data may no longer be valid and resumption of the execution of the E2E process at this point of failure may again result in failure. Conventionally, a user manually analyzes the E2E scenario to identify an appropriate point to resume execution of the E2E process. This analysis may be a time-consuming and error-prone process, where the user is expected to have functional knowledge of all the processes involved in the scenario.

Systems and methods are desired which make it easier to identify a resumption point in the execution of an E2E process.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 6A is a non-exhaustive example of a primary query/request table according to some embodiments.

FIG. 6B is a non-exhaustive example of a reference table for status according to some embodiments.

FIG. 6C is a non-exhaustive example of a reference table for response properties according to some embodiments.

Figure 1:
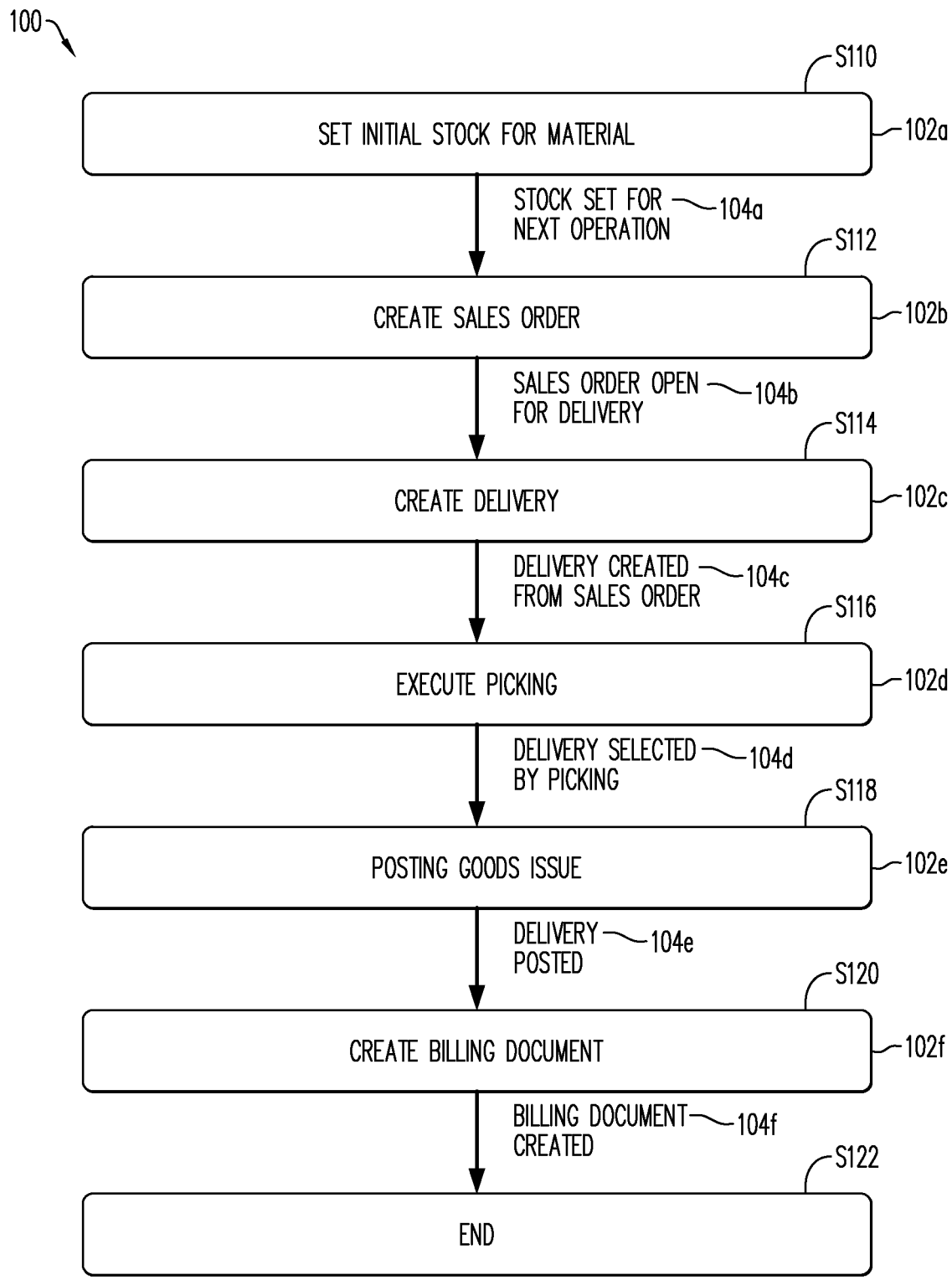
FIG. 1. is a first non-exhaustive example of an E2E scenario.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, an End-to-End (E2E) process is a sequence of functional processes which may create a value stream delivering outcomes defined and expected by a process user initiating and benefiting from the process outcome. The E2E process may refer to every step of a task from start to finish and may take a system or service from beginning to end and deliver a complete functional data output. When the E2E process is automated, it may automatically run step-by-step (e.g., the first step is executed, and once the first step is successful, if there is a need to pass data from that step to another step, that data is automatically passed on to the next step). E2E testing may be used to test the functionality and performance of a scenario under particular circumstances and with particular data to replicate live settings to simulate what a real user scenario looks like from start to finish.

When testing an automated End-to-End (E2E) process, a test automation tool may execute a plurality of a scripts/automates that may be chained or linked together, as are the process steps in the E2E process, whereby data output from one automate is an input to a second automate further along in the process. As used herein, the terms "automated test script," "automate," "test," "script" and "automation" may be used interchangeably.

FIG. 1 provides a non-exhaustive example of an E2E process 100 under test for "Sell from Stock." Initially, at S110, a first automate 102a sets an initial stock for a material. In this step, the system may identify an amount stock available for a given material. An output 104a of S110 is that the stock is set for the next process step. The next process step is executed in S112 by a second automate 102b to create a sales order. The sales order is created based on an availability of stock for the material and may be assigned a sales order ID. The sales order ID may be a combination of alphanumeric characters according to a set-up of the system. The sales order ID may be stored as a variable. Once the sales order is generated as an output 104b of S112, that sales order is open for delivery, and the variable for the sales order ID may be passed to the next process step S114. Process step S114 may be executed by a third automate 102c that uses the sales order ID as input to create an outbound delivery instruction including a delivery ID as output 104c. The sales order ID variable may be pre-requisite for the execution of S114.

The delivery ID output 104c in S114 may then be used as input in process step S116 to execute a picking. A picking is the taking/collecting of articles in a specified quantity (in this example, the given material) before shipment to satisfy an order. Execution of the picking process step S116 by a fourth automate 102d may output a picking document ID as output 104d and indicate that the delivery has been selected by picking. Next, process step S118 may be executed by a fifth automate 102e that uses the received picking document ID output 104d to post goods issue. Posting goods issue may generate a posting ID as output 104e and indicate that the delivery has been sent/posted. Then, process step S120 may be executed by a sixth automate 102f that uses the posting ID output 104e to create a billing document. Creating the billing document may generate a billing ID as output 104f and/or may create the billing document itself as output 104f, ending the E2E process 100. It is noted that while the E2E process described with respect to FIG. 1 has each automate generating an output that flows to another automate in a one-to-one fashion, in other E2E processes, a single output may be input to two or more other automates. For example, the delivery ID may be passed to the execute picking automate and the posting goods issue automate.

It is noted that while the E2E process 100 in FIG. 1 includes six steps, an E2E process may typically have between fifteen and 20 steps and may have as many as 90 steps. Each step takes a certain amount of time. As a non-exhaustive example, each step in the E2E process 100 of FIG. 1 may take five minutes, making the whole process 100 take 30 minutes to execute. With each step taking five minutes, a 90 step process may take seven and a half hours.

In E2E testing, the E2E process is executed to determine whether the process executes as expected. For example, there may be a problem with one of the executing automates or data that may cause an error that prevents the E2E process from executing as expected.

Figure 2:
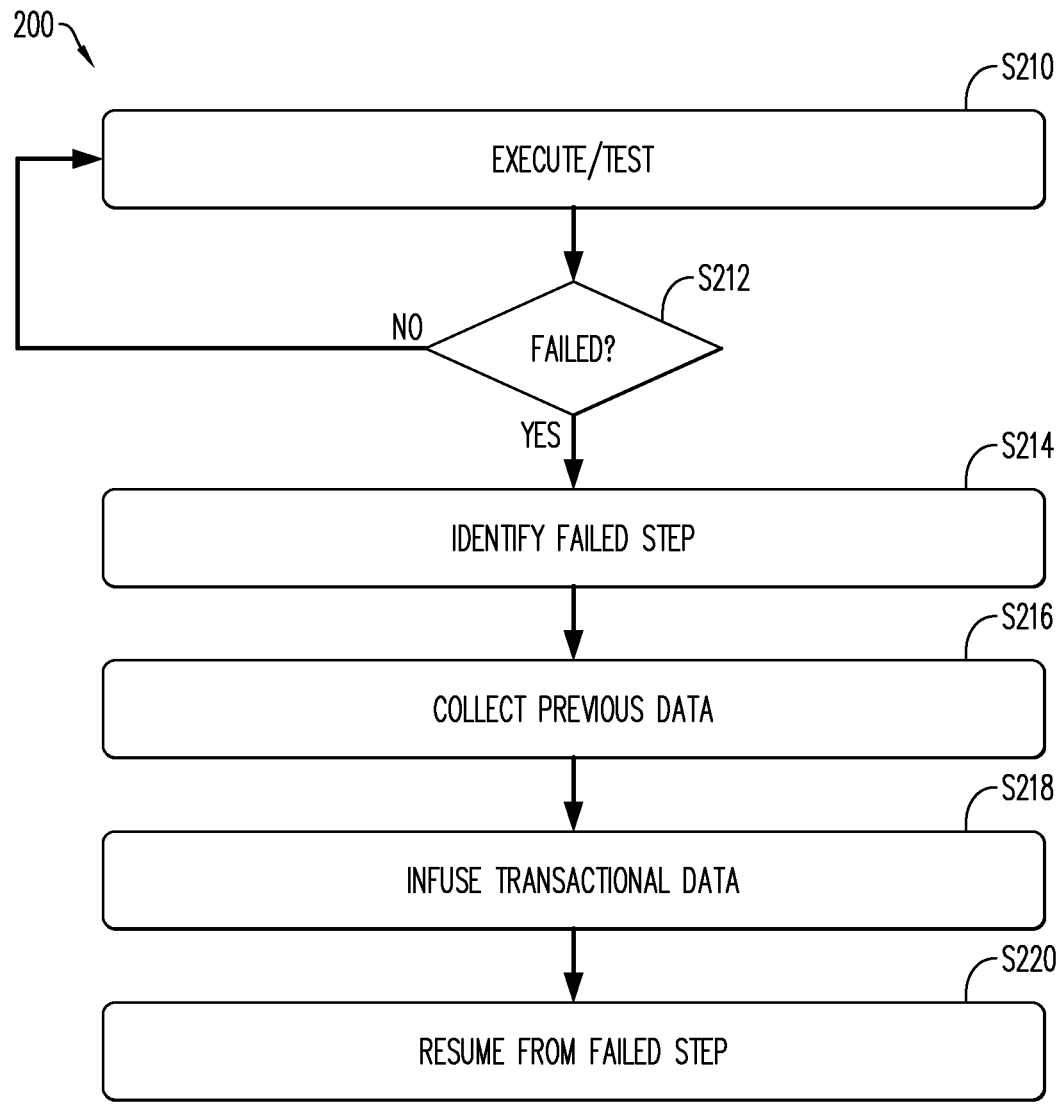
FIG. 2 is a flow diagram of a conventional resumption process.

Continuing with the E2E process 100 in FIG. 1, take as an example the E2E process 100 experiencing an error at the posting goods issue S118. A conventional test automation tool (not shown) may execute the process 200 shown in FIG. 2. In S210 testing of the E2E process is initiated. At S212 it is determined whether there is a failure in the test. This may be determined for each step in the E2E sequence. In a case it is determined at S212 there is no failure, the process returns to S210, and the next process step is executed. Continuing with the E2E process 100 example of FIG. 1, S210 and S212 will be repeated for each of S110 to S114. In a case it is determined at S212 there is a failure, the user may be notified of the failure. A failure may be identified by a process step's inability to execute/output an expected output. The user at this point may select a "resume" button or indicator that may resume the E2E process 100. The conventional process 200 proceeds to S214 and the failed step is identified so that the conventional automation tool can resume from this step. Continuing with the example, the conventional automation tool will try to execute the E2E process 100 from the Posting Goods Issue S116.

In S216, the process collects previously generated transactional data, and then infuses or inputs this transactional data into the automate that will be the resume point in S218. Next, the process is resumed from the failed process step in S220. Ideally when the tool resumes testing of the E2E process, it may use the transactional data that was generated in the previous steps. For example, the picking document ID to create a posting goods issue. In one case, this picking document ID may be used to create the posting goods issue. However, often by the time of the "resume," the previously generated data may no longer be available, as it may have expired or is no longer valid. For example, the picking document ID has a pre-set time that it is available for use in the test after which time it is unavailable/expired. As another example, the picking document ID is used by another iteration of the test as there are multiple tests being executed with the tool, making the picking document ID invalid for use in a resumption of the process. Other examples may exist as to why the picking document ID is unavailable. As such, the resume function in the conventional tool may not work to continue the process as when the tool tries to execute the posting goods issue it may fail as the picking ID provided by the execute picking step S116 is unavailable/invalid (e.g., already used or expired).

At this point, the conventional user may manually analyze each process step to determine how to fix the failure. Continuing with the above example, the user may determine the E2E process 100 failed because the picking document ID is already consumed/unavailable. The user may then try to resume the process from the previous step to the execute picking step. As described above, for the picking step to execute, the automate needs the delivery ID output. However, the delivery ID output was already consumed by the execute picking step when the flow was initially executed, so it is unavailable/invalid. The user may, for example, change the data in the automate to provide a valid delivery ID output, or may retrieve another stored picking document ID output that has not yet been consumed. However, the inventors note that the user analyzing the error may need to be a functional expert with unambiguous functional knowledge of each process to understand the transactional data flow, their dependencies and state with respect to each process step to judge what data is appropriate for the automate. While the user may find a point where the output is valid, the user may also find they need to re-execute the scenario from the beginning. This analysis may have taken five to ten minutes, and now the process needs to be re-executed from the beginning for another 30 minutes. The inventors note that the time spent may vary based on the number of steps and point of failure. For example, while the error described above cost the spent time of steps to failure (20 minutes) plus the analysis time (five to ten minutes), in a case of 90 process steps with a failure at step 89, the cost may be many hours.

By virtue of some embodiments, a resume module is provided that when initiated intelligently identifies the failed automate (e.g., point of failure), its dependent data, validates the state of the transactional data, and identifies the point of resume for the E2E process. In embodiments, data validation may provide information related to the ability of resuming the E2E process from a point of failure. As described in the above example, it is not only the state of the current failed automate's transactional data that impacts resumption of the process, but all of the relevant or chained dependent data up the hierarchy of the process tree. In embodiments, in a case the resume module validates the failed automate's dependent transactional data for its desired state and finds the data invalid to be used in the process step of that failed automate, the resume module may iteratively scan all the bound transactional preceding data up in the hierarchy of the process to validate and find a point of resume.

Embodiments provide for user's execution of E2E process tests including resumption of the E2E process test without having functional knowledge of all the process steps involved in the E2E process. The validation provided by the resume module may help users avoid repeating work with respect to identifying data generation automates and triggering execution from a given data generation automate. Since a goal of automation is to automatically trigger a process with less/no manual intervention, embodiments providing data validation with respect to resumption of the process may reduce the manual effort of maintaining correct transactional data and may help achieve successful automatic execution of E2E process tests. Embodiments may reduce the time needed to complete an execution of an E2E process test.

Figure 3:
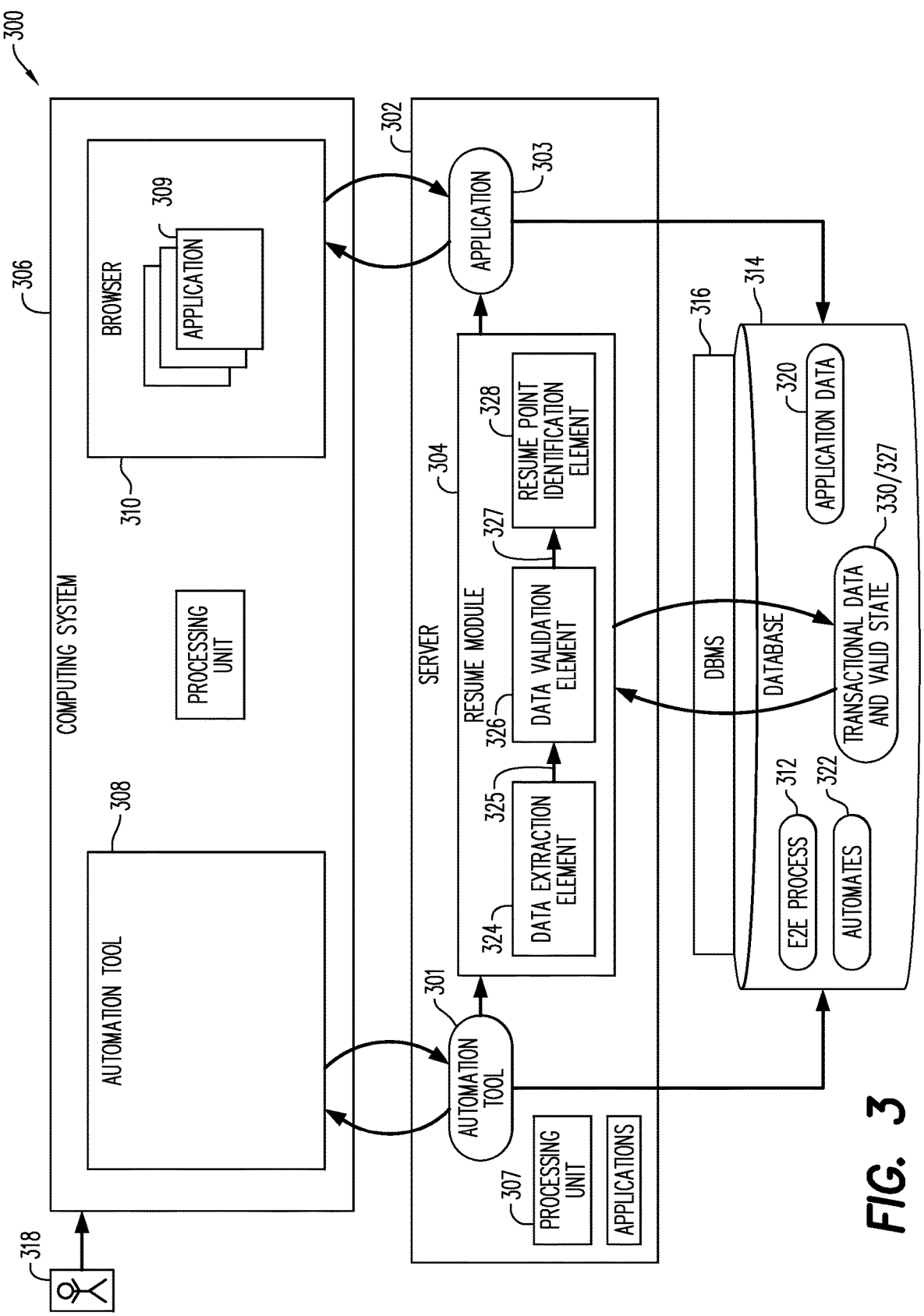
FIG. 3 is a block diagram of an architecture to automatically identify a resumption point and resume execution of the E2E scenario according to some embodiments.

FIG. 3 is a block diagram of architecture 300 according to some embodiments. The illustrated elements of architecture 300 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 300 are implemented by a single computing device, and/or two or more elements of architecture 300 are co-located. One or more elements of architecture 300 may be implemented using cloud-based resources, and/or other systems which apportion computing resources elastically according to demand, need, price, and/or any other metric.

Architecture 300 includes a server 302 including a remote cloud-based automation tool 301 and a remote cloud-based application 303, a resume module 304, a local computing system 306 including a corresponding automation tool 308 and browser 310, an E2E process 312 under test, a database 314, a database management system (DBMS) 316, and a client 318. As used herein, the terms "client," "user" and "end-user" may be used interchangeably.

Server 302 may comprise an on-premise server, a cloud-deployed virtual machine, or any other suitable computing system to provide the functions described herein. The server 302 may include applications 303. Applications 303 may comprise server-side executable program code (e.g., compiled code, scripts, etc.) executing within the server 302 to receive queries/requests from clients 318, via the local computing system 306, and provide results to clients 318 based on the data of database 314. A client 318 may access, via the automation tool 301/308, the resume module 304 executing within the server 302, to resume execution of the E2E process test after failure, as described below.

The server 302 may provide any suitable interfaces through which users 318 may communicate with the resume module 304 or applications 303/309 executing thereon. The server 302 may include a Hyper Text Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

Local computing system 306 may comprise a computing system operated by local client 318. Local computing system 306 may comprise a laptop computer, a desktop computer, or a tablet computer, but embodiments are not limited thereto. Local computing system 306 may consist of any combination of computing hardware and software suitable to allow system 306 to execute program code to cause the system 306 to perform the functions described herein and to store such program code and associated data.

Generally, computing system 306 executes one or more of applications 309 to provide functionality to client 318. Applications 309 may comprise any software applications that are or become known, including but not limited to data analytics applications. As will be described below, applications 309 may comprise web applications which execute within a web browser 310 of system 306 and interact with corresponding remote cloud-based applications 303 to provide desired functionality. Client 318 may instruct system 306 as is known to execute one or more of applications 303/309 and may interact with resulting displayed user interfaces of the executing applications 303/309 to obtain the desired functionality therefrom.

The automation tool 308 may access data in the database 314 and then may reflect/show that information on a user interface. The automation tool may fetch the data from the database 14 so that it is provided at runtime. While discussed further below, the database 314 may store data representing an E2E process 312. It is noted that even though the database 314 stores the E2E process and automates, the viewing of the E2E process 312 is via the automation tool 308. Database 314 represents any suitable combination of volatile (e.g., Random Access Memory) and non-volatile (e.g., fixed disk) memory used by system 306 to store the data. Application data 320 may comprise data defining objects accessible by the E2E process. The database 314 may also store one or more generated automates 322 that may be used in execution of the E2E process 312. For example, each process step in FIG. 1 may be associated with a respective automate. The automates 322 may be generated by any suitable automate-generation process including, but not limited to, a code-based method, a model-based method and a record-replay-based method.

According to some embodiments, one or more automates 322 may be scheduled for local execution by local computing system 306. The local computing system 306 may execute automates 322 for the E2E process 312 under test according to their respective schedule. The E2E process 312 under test may be tested by the automation tool 308. Execution of an automate 322 may include performance of activities in the sequence designated by the automation.

The resume module 304 may include a data extraction element 324, a data validation element 326 and a resume point identification element 328.

Responsive to selection by the client/user 318 of a resume indicator (not shown) after notification of a E2E process failure, the data extraction element 324 may include program code to extract the transactional data input to the failed automate 322 in the executing E2E process 312. In some embodiments, the input transactional data may be marked or tagged so that the data extraction element 324 may identify and extract the data. The E2E process failure may occur when an automate fails to generate an expected output, as described further below. The user 318 may be notified of the failure and may select a resume indicator from a user interface (not shown) (e.g., the user may select a resume button).

The data extraction element 324 may transmit the extracted transactional data 325 to the data validation element 326. The data validation element 326 may include program code to determine a valid state 327 (e.g., valid or invalid) of an object included in the extracted transactional data 325. The extracted transactional data 325 may be valid in a case that it may be used by a subsequent automate, else the extracted transactional data 325 may be invalid. Extracted transactional data 325 may be used by a subsequent automate in a case that it has not already been consumed by a subsequent automate and it has not expired.

The valid state 327 may be transmitted from the data validation element 326 to a resume point identification element 328. The resume point identification element 328 may include program code that identifies an automate at which to resume the E2E process based on the valid state 327. For example, in a case a valid state 327 for an object input to an automate immediately preceding the failed automate is valid, the resume point identification element 328 may identify that immediately preceding automate as the resume point (e.g., automate at which to resume the E2E process).

One or more applications 303/309 executing on server 302 or local computing system 306, respectively, may communicate with DBMS 316 using database management interfaces such as, but not limited to, Open Database Connectivity (ODBC) and Java Database Connectivity (JDBC) interfaces. These types of applications 303/309 may use Structured Query Language (SQL) to manage and query data stored in database 314.

DBMS 316 serves requests to store, retrieve and/or modify data of database 314, and performs administrative and management functions. Such functions may include snapshot and backup management, indexing, optimization, garbage collection, and/or any other database functions that are or become known. DBMS 316 may also provide application logic, such as database procedures and/or calculations, according to some embodiments. This application logic may comprise scripts, functional libraries and/or compiled program code. DBMS 316 may comprise any query-responsive database system that is or becomes known, including but not limited to a structured-query language (i.e., SQL) relational database management system.

Server 302 may provide application services (e.g., via functional libraries) which applications 303/309 may use to manage and query the data of database 314. The application services can be used to expose the database data model, with its tables, hierarchies, views and database procedures, to clients. In addition to exposing the data model, server 302 may host system services such as a search service.

Database 314 may store data used by at least one of: applications 303/309 and the resume module 304, as well as E2E process 312, automates 322, and application data 320, as described above. For example, database 314 may store transactional data and valid states 330/327, accessed by the resume module 304 during execution thereof.

Database 314 may comprise any query-responsive data source or sources that are or become known, including but not limited to a structured-query language (SQL) relational database management system. Database 314 may comprise a relational database, a multi-dimensional database, an extensible Markup Language (XML) document, or any other data storage system storing structured and/or unstructured data. The data of database 314 may be distributed among several relational databases, dimensional databases, and/or other data sources. Embodiments are not limited to any number or types of data sources.

Presentation of a user interface as described herein may comprise any degree or type of rendering, depending on the type of user interface code generated by the server 302/local computing system 306.

For example, a client 318 may execute a Web Browser to request and receive a Web page (e.g., in HTML format) from a website application 303 of server 302 to provide the UI via HTTP, HTTPS, and/or WebSocket, and may render and present the Web page according to known protocols.

Figure 4:
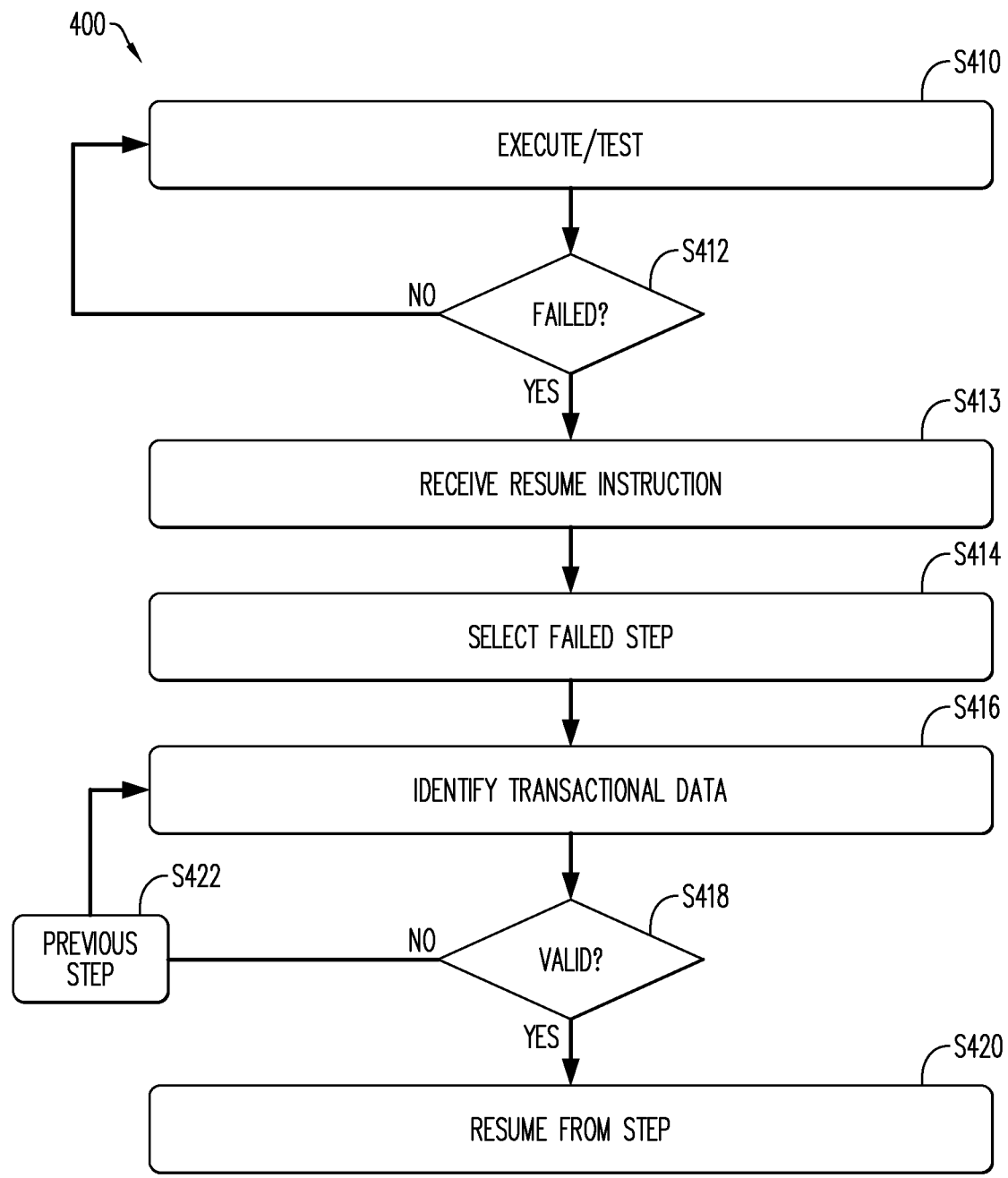
FIG. 4 is a flow diagram of a process according to some embodiments.

FIG. 4 illustrates a method 400 of resuming a test of an automated E2E process in accordance with an example embodiment. For example, the method 400 may be performed by a database node, a cloud platform, a server, a computing system (user device), a combination of devices/nodes, or the like, according to some embodiments. In one or more embodiments, the computing system 306 or server 302 may be conditioned to perform the process 400, such that a processing unit 307 of the system 300 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the start of the process 400, an E2E process 312 for testing is selected. The selection may be by a user via a user interface, for example, or via other selection process.

Initially at S410, testing of the selected E2E process 312 is initiated. With the initiation of the testing, a first automate for a first process step in the sequence of automates/process steps for the selected E2E process is executed. The automates may be executed in a sequential order that matches a sequential order of the process steps. Transactional data 330 generated by the executed automate may be stored in the database 314. At S412 it is determined whether the executed automate failed. This may be determined for each sequential automate and associated process step in the E2E process. As described above, execution of the automate fails in a case an output of the automate is not as expected. This unexpected output may include not producing an output. In a case it is determined at S412 there is no failure, the process returns to S410 and the next automate for the next process step in the sequence is run. It is noted that the process 400 may continue to run process steps until all of the process steps have been run and then the process 400 may end when no process steps remain. Continuing with the E2E process 100 example of FIG. 1, S410 and S412 will be repeated for each of S110 to S114. In a case it is determined at S412 there is a failure, the user is notified. It is noted there may be failure because of a server issue, application issue, or data (e.g., the data has not properly come into the system), a faulty automate or a faulty step. Giving the user the opportunity to enter a "resume" instruction to continue the process 400 allows the user to adjust went wrong in the process, if a server/application issue and continue from there; otherwise, the error will keep occurring. A "resume" instruction is received at S413 responsive to a user selection of a "resume" button, or other selector or indicator, and then a failed process step/automate is selected at S414. In embodiments, the resume module 304 may select a failed process step/automate based on a process step/automate's inability to completely execute and generate an expected output. Continuing with the E2E process 100 of FIG. 1, as a non-exhaustive example, the process 100 failed at the posting goods issue process step S118. For the selected failed process step, the resume module identifies at S416 the transactional data input to the automate in execution of the failed process step. In the case of the posting goods issue process step S118, the transactional input data 330 is the picking document ID. The data extraction element 324 may extract the transactional input data (in this case the picking document ID) that was input to the posting goods issue process step S118. The transactional input data may be extracted from the database 314, and in particular from a log that stores earlier execution failure data.

Then in S418 the data validation element 326 determines a valid state 327 for the extracted transactional data 325 (in this case the picking document ID). In some embodiments, the data validation element 326 may determine the valid state 327 for the extracted transactional data 325 by executing a query 608 (FIG. 6A). In some embodiments, when the automate itself is developed, one or more queries are also developed and are mapped to the automate along with a state of the object in the transactional data output by the automate. In embodiments, one or more queries 608 may be mapped to every process step/automate available in the E2E process. As a non-exhaustive example, the primary query/request table 600 (FIG. 6A) shows that for the sales order data reference 606, the query 608 is to locate the sales order. In this case, since the posting goods issue automate needs the picking document ID, a developer may write a query saying "the picking document ID which was already available at this point of time, is it a valid picking document ID or not?" The data validation element 326 then receives the response to the query in the form of a valid state 327 (i.e., valid or invalid). Next, the data validation element 326 transmits the valid state 327 to the resume point identification element 328.

In a case the data validation element 326 determines the extracted transactional data 325 is valid in S418, the process 400 may proceed to S420, and the resume point identification element 328 identifies the E2E process step that may resume the E2E process (i.e., the next step in the sequence that may receive the valid data as input). In the case the query returns a validation status of valid for the picking document ID, the E2E process may resume at the posting goods issue step of S118, using that picking document ID as the input to that fifth automate 102e.

In a case the data validation element 326 determines the extracted transactional data 325 is invalid in S418, the process 400 may proceed to S422 and the resume module 304 may identify dependent transactional data. Data dependency is a situation/position in which an instant process step/instruction is dependent on a result from a sequentially earlier/previous step before the instant process step can complete its execution. In S422, the resume module 304 selects the process step that immediately precedes the step for which the dependent transactional data is invalid for input. In the case the query returns a validation status of invalid for the picking document ID (which is dependent transactional data as it is dependent on the execution of the preceding executing picking step), the resume module 304 selects the executing picking step S116. Next, the process returns to S416 and transactional data input in execution of the selected process step is identified. Continuing with the example, in the case of the executing picking process step S116, the transactional input data 330 is delivery ID output. The picking document ID is dependent on execution of the executing picking process step, which in turn is dependent on the input of delivery ID output. In a case the delivery ID output is valid per S418, the E2E process resumes from the executing picking process step S116. In a case the delivery ID output is invalid per S418, the process 400 selects the create delivery process step S114 and proceed as above. Process steps S416-S422 are an iterative process that is executed automatically at every E2E process step level, without manual interaction by the user 318. The only manual interaction by the user 318 is the selection of a resume indicator upon receipt of notification of a failure.

It is noted that in other embodiments, instead of using one or more queries to determine a validation status, the data validation element 326 may capture the service calls and use the most appropriate call to obtain the state of the transactional data by reading properties from the response and deriving the status through Natural Language Processing (NLP). For example, when a sales order is created, there are certain queries or calls which are made to a back-end element indicating the sales order was created. This particular service call may automatically invoke/trigger the queries that are built-in to the application and then get this data. Based on the information returned from the query, the resume module 304 may determine the resume process step for the E2E process. Continuing with the example, in the case an open sales order ID is identified, the E2E process may resume at the create delivery process step S114, as the sales order ID is the input to this third automate 102c.

Figure 5:
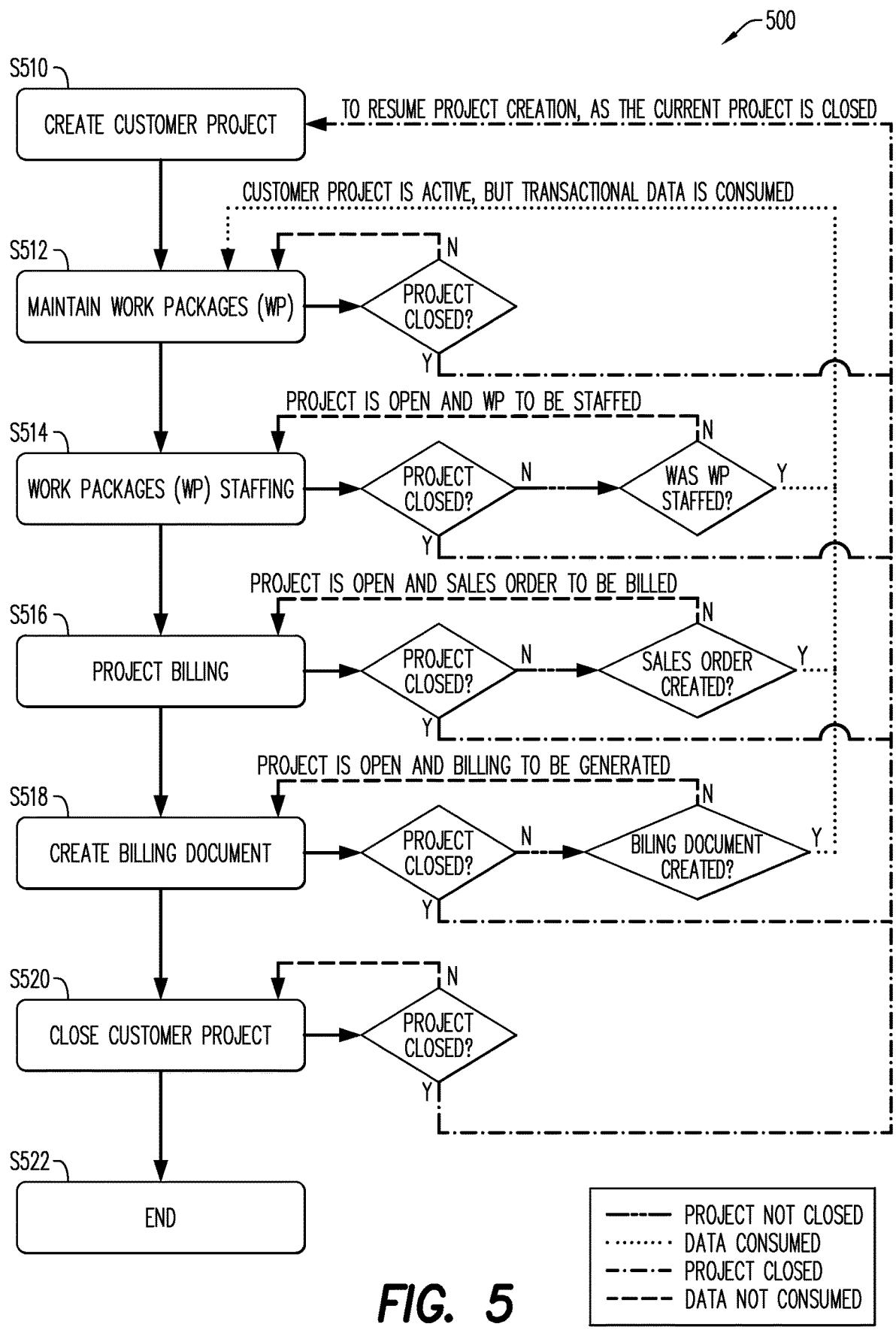
FIG. 5 is a second non-exhaustive example of an E2E scenario.

FIG. 5 is a second non-exhaustive example of an E2E scenario 500. This scenario explains an E2E process for "Customer Project Management." The scenario 500 starts at S510 with the creation of a customer project, maintaining work packages in S512 and staffing them to the created project in S514. The project is then subjected for billing in S516 and a billing document is created in S518 before the created customer project is closed in S520. Each process step (S510, S512, S514, S516, S518 and S520) has an individual automate, and the automates are executed in the sequential order of the process steps. In case of failure, conventional tools may resume from the point of failure without checking the state of the customer project and the linked step status. In one or more embodiments, on the other hand, the resume module 304 may check the state of the customer project (active/closed) at each process step, and in a case the project is closed, execution of the E2E process resumes from creation of the customer projection (S510). In a case the project is not closed, and the E2E process failed at the Project Billing process step S516, for example, the resume module 304 checks the state of the "Sales order," and, whether the sales order was created for the project. In a case the sales order is not created, the E2E process execution is set to resume from Project Billing process step S516 because the sales order has not been consumed by this step. In a case the sales order was created, the E2E process execution may be set to resume from a maintain work packages step S512 as the transactional data from the previous steps has already been consumed. The reason for this may be, for example, that multiple work packages may be created for a same customer project, thereby consuming the staffing output and sales order output.

Referring to FIGS. 6A, 6B and 6C, tables 600, 630 and 660 are shown that represent a primary query/request table 600, a reference table for status 630 and a reference table for property in response 660, respectively, that may be stored at the database 314 according to some embodiments.

The primary query/request table 600 may include, for example, entries associated with queries/services calls used to validate the status of an object of transactional data. The table 600 may also define fields 602, 604, 606, 608, 610 and 612 for each of the entries. The fields 602, 604, 606, 608, 610 and 612 may, according to some embodiments, specify: a prime GUID 602, an application ID 604, a data reference 606, a query/service request 608, a mode 610 and a status 612.

The reference table for status 630 may include, for example, entries associated with a status for a particular object of transactional data. The table 630 may also define fields 632, 634 and 636 for each of the entries. The fields 632, 634 and 636 may, according to some embodiments, specify: a status GUID 632, a prime GUID 634 and a status 636.

The reference table for property in response 660 may include, for example, entries associated with response properties for a particular object of transactional data. The table 660 may also define fields 662 and 664 for each of the entries. The fields 662 and 664 may, according to some embodiments, specify: a prime GUID 662 and a response property 664.

Figure 7:
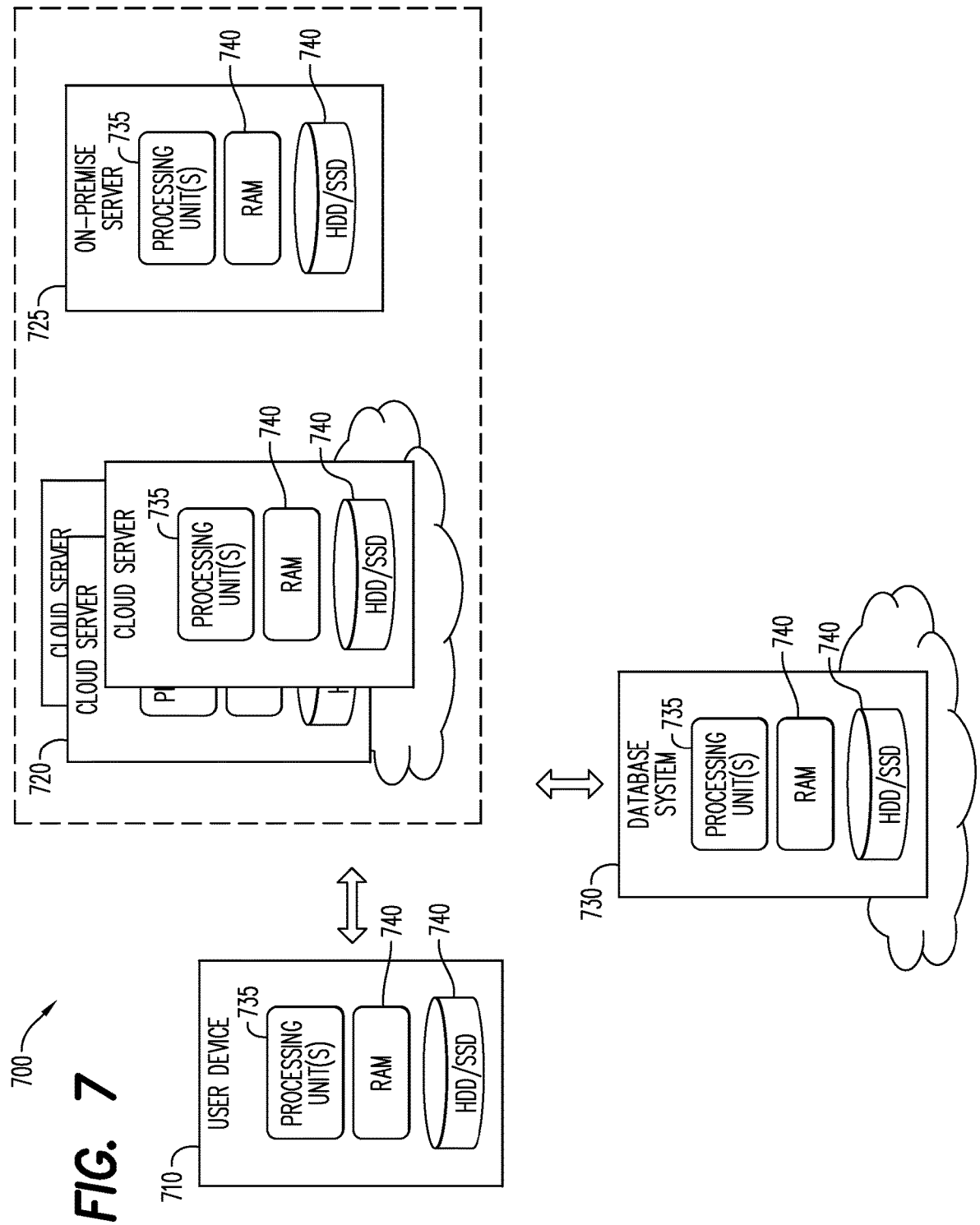
FIG. 7 is a block diagram of a cloud-based database deployment architecture according to some embodiments.

FIG. 7 illustrates a cloud-based database deployment 700 according to some embodiments. The illustrated components may reside in one or more public clouds providing self-service and immediate provisioning, autoscaling, security, compliance and identity management features.

User device 710 may interact with applications executing on one of the cloud application server 720 or the on-premise application server 725, for example via a Web Browser executing on user device 710, in order to create, read, update and delete data managed by database system 730. Database system 730 may store data as described herein and may execute processes as described herein to cause execution of automates for an E2E process on the user device 710 and storage of the generated transactional data. Cloud application server 720 and database system 730 may comprise cloud-based compute resources, such as virtual machines, allocated by a public cloud provider. As such, cloud application server 720 and database system 730 may be subjected to demand-based resource elasticity. Each of the user device 710, cloud server 720, on-premise server 725, and database system 730 may include a processing unit 735 that may include one or more processing devices each including one or more processing cores. In some examples, the processing unit 735 is a multicore processor or a plurality of multicore processors. Also, the processing unit 735 may be fixed or it may be reconfigurable. The processing unit 735 may control the components of any of the user device 710, cloud server 720, on-premise server 725, and database system 730. The storage devices 740 may not be limited to a particular storage device and may include any known memory device such as RAM, ROM, hard disk, and the like, and may or may not be included within a database system, a cloud environment, a web server or the like. The storage 740 may store software modules or other instructions/executable code which can be executed by the processing unit 735 to perform the method shown in FIG. 4. According to various embodiments, the storage device 740 may include a data store having a plurality of tables, records, partitions and sub-partitions. The storage device 740 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   at least one end-to-end (E2E) scenario including a sequence of process steps;
   a plurality of automates, wherein an automate is a program code test script executable for each process step that simulates an end user's actions to complete each process step;
   a memory storing processor-executable program code; and
   a processing unit to execute the processor-executable program code to:
      execute the plurality of program code test scripts in a sequential order that matches a sequential order of the process steps;
      for each executed program code test scripts, determine whether the executed automate failed;
      in a case it is determined the executed program code test script failed, identify dependent transactional data input to the failed program code test script, wherein the dependent transactional data includes one or more data objects and the dependent transactional data input includes data created during execution of a sequentially previous program code test script;
      identify a validity state of each data object; and
      resume execution of the process steps based on the identified validity state.

2. The system of claim 1, further comprising processor-executable program code to:
   in a case the validity state of the data object is valid, resume execution of the failed automate.

3. The system of claim 1, further comprising processor-executable program code to:
   in a case the validity state of the data object is invalid, identify dependent transactional data including one or more data objects input to a second automate, wherein the second automate immediately precedes the failed automate in the sequence of process steps;
   identify a validity state for each data object input to the second automate; and
   resume execution based on the identified validity state.

4. The system of claim 3, further comprising processor-executable program code to:
   in a case the validity state of the data object input to the second automate is valid, resume execution of the second automate.

5. The system of claim 3, further comprising processor-executable program code to:
   in a case the validity state of the data object input to the second automate is invalid, identify dependent transactional data including one or more data objects input to a third automate, wherein the third automate immediately precedes the second automate in the sequence of process steps.

6. The system of claim 1, wherein the determination the automate has failed is based on receipt of a notification of failure.

7. The system of claim 1, wherein the validity state is identified based on execution of at least one query.

8. The system of claim 7, wherein the at least one query is one of manually generated and mapped to the automate or automatically triggered based on a service call.

9. A method comprising:
   executing a plurality of automates in a sequential order that matches a sequential order of process steps in an end-to-end (E2E) scenario, wherein each automate is a program code test script executable for each process step that simulates an end user's actions to complete each process step;
   for each executed program code test script, determining whether the executed program code test script failed;
   in a case it is determined the executed program code test script failed, identifying dependent transactional data input to the failed program code test script, wherein the dependent transactional data includes one or more data objects and the dependent transactional data input includes data created during execution of a sequentially previous program code test script;
   identifying a validity state of each data object via execution of a query; and
   resuming execution of the process steps based on the identified validity state.

10. The method of claim 9, further comprising:
    in a case the validity state of the data object is valid, resuming execution of the failed automate.

11. The method of claim 9, further comprising:
    in a case the validity state of the data object is invalid, identifying dependent transactional data including one or more data objects input to a second automate, wherein the second automate immediately precedes the failed automate in the sequence of process steps;
    identifying a validity state for each data object input to the second automate; and
    resuming execution based on the identified validity state.

12. The method of claim 11, further comprising:
    in a case the validity state of the data object input to the second automate is valid, resuming execution of the second automate.

13. The method of claim 11, further comprising processor-executable program code to:
    in a case the validity state of the data object input to the second automate is invalid, identifying dependent transactional data including one or more data objects input to a third automate, wherein the third automate immediately precedes the second automate in the sequence of process steps.

14. The method of claim 9, wherein the determination the automate has failed is based on receipt of a notification of failure.

15. The method of claim 14, wherein the query is one of manually generated and mapped to the automate or automatically triggered based on a service call.

16. A non-transitory, computer readable medium having executable instructions stored therein to perform a method, the method comprising:
    executing a plurality of automates in a sequential order that matches a sequential order of process steps in an end-to-end (E2E) scenario, wherein each automate is a program code test script executable for each process step that simulates an end user's actions to complete each process step;
    for each executed program code test script, determining whether the executed program code test script failed;

in a case it is determined the executed program code test script failed, identifying dependent transactional data input to the failed program code test script, wherein the dependent transactional data includes one or more data objects;

identifying a validity state of each data object via execution of a query; and resuming execution of the process steps based on the identified validity state.

17. The medium of claim 16, further comprising:

in a case the validity state of the data object is valid, resuming execution of the failed automate.

18. The medium of claim 16, further comprising:

in a case the validity state of the data object is invalid, identifying dependent transactional data including one or more data objects input to a second automate, wherein the second automate immediately precedes the failed automate in the sequence of process steps;

identifying a validity state for each data object input to the second automate; and resuming execution based on the identified validity state.

19. The medium of claim 18, further comprising:

in a case the validity state of the data object input to the second automate is valid, resuming execution of the second automate.

20. The medium of claim 18, further comprising processor-executable program code to:

in a case the validity state of the data object input to the second automate is invalid, identifying dependent transactional data including one or more data objects input to a third automate, wherein the third automate immediately precedes the second automate in the sequence of process steps.

\* \* \* \* \*